UNITED STATES PATENT OFFICE 2,651,444

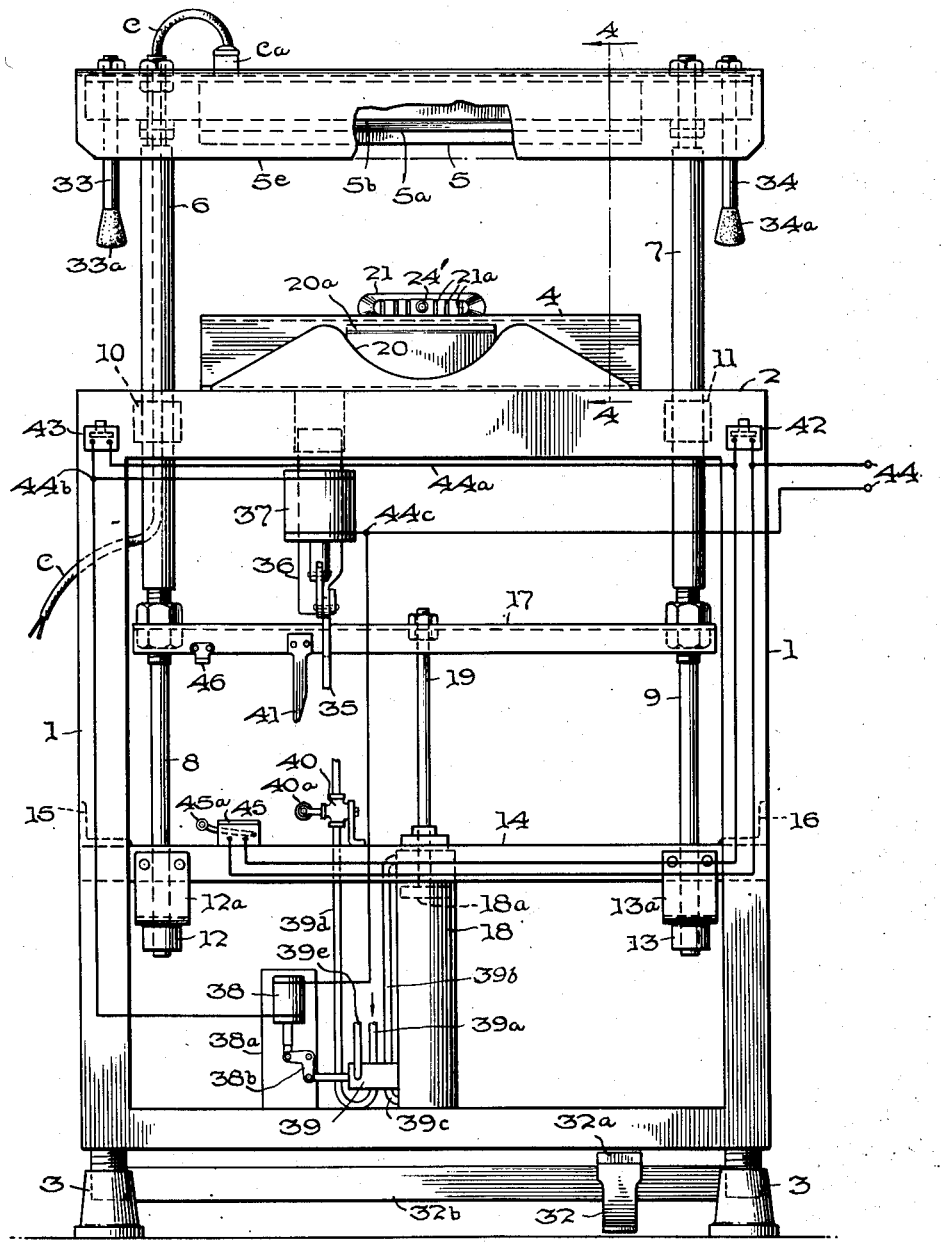

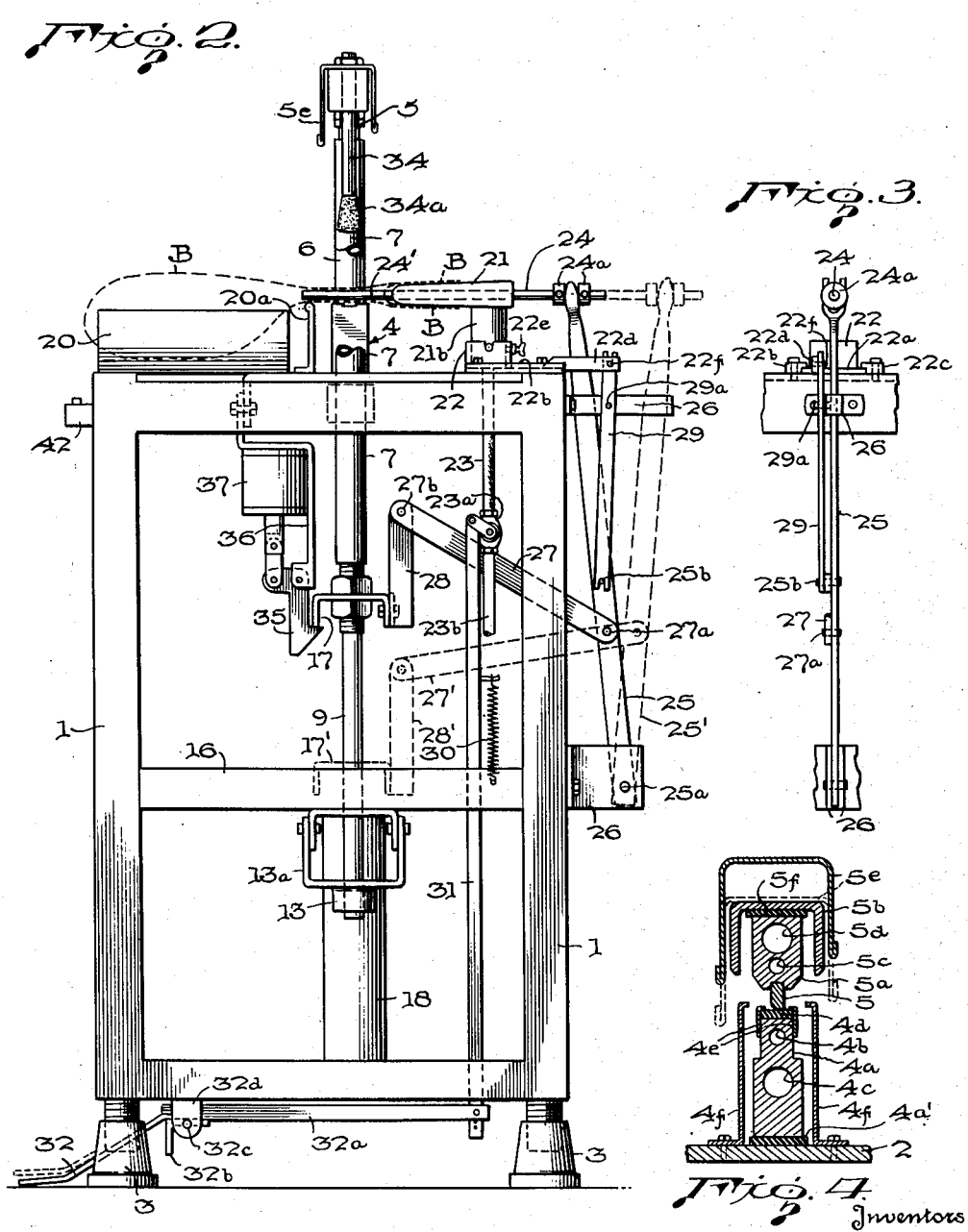

BAG SEALING MACHINE

Francis B. Casey, Concord, Robert Reed Woodcock, Weymouth, and Manson E. Wood, Wakefield, Mass., assignors to Dewey and Almy Chemical Company, North Cambridge, Mass., a corporation of Massachusetts Application November 26, 1947, Serial No. 788,262

2 Claims. (Cl. 226—56)

This invention relates to packaging machines of the type for sealing articles or materials within flexible bags.

The broad object of the invention is to devise a machine for evacuating and sealing flexible bags after they have been filled.

The present invention is especially designed for the sealing of bags formed of heat-sealable sheet or tube material. Such materials include rubber, but now are usually made from the many sheet-forming thermoplastic compositions. The most common of these are plasticized cellulose esters, polyethylene, polymers and copolymers of polyvinyl chloride, rubber hydrohalides, polymers and copolymers of polyvinylidene chloride and in addition heat-sealable regenerated cellulose. Simple adjustments of heat and time adapt our machine to heat-seal any such sheet material.

A more specific object is to devise means for maintaining a vacuum connection through the mouth of the bag during evacuation and to prevent the collapse folds of the bag from cutting off the vacuum connection.

Another object of the invention is to devise means for relieving the tension on the neck of the bag during the sealing operation.

Still another object is to incorporate safety devices in the packaging machine to prevent injury to the operator.

The packaging machine of the present invention includes a suitable support for the bag and its contents, an evacuating nozzle over which the mouth of the bag is positioned during evacuation, and a pair of sealing jaws arranged to engage opposite sides of the neck of the bag in front of the evacuating nozzle to heat-seal the bag. The evacuating nozzle is provided with a tubular extension which projects through the neck of the bag beyond the sealing jaws and into a position where the end of the tube cannot be sealed by the wall of the bag, and suitable means is provided for retracting the tubular extension simultaneously with the closing of the sealing jaws. Also, while the bag is being evacuated the neck of the bag becomes somewhat stretched, and it is desirable to relieve the tension on the neck of the bag at the time of forming the seal. For this purpose, provision is made for shifting the evacuating nozzle forward a slight amount simultaneously with the closing of the sealing jaws. The heat-seal may be accomplished by the use of heated sealing jaws or by jaws formed as electrodes which apply high frequency energy to the neck of the bag to generate the necessary heat within the bag material.

The invention is illustrated in a rather diagrammatic manner in the accompanying drawing in which Figure 1 is a front elevational view of the preferred form of the machine;

Figure 2 is a side view of Figure 1 with certain parts broken away;

Figure 3 is a fragmentary rear view of the machine of Figures 1 and 2 illustrating the arrangement for shifting the evacuating nozzle.

Figure 4 is a sectional view of a portion of Figure 1 taken along the cutting line 4—4 showing the construction of the sealing jaws in sealing position, but on an enlarged scale.

Referring to the drawings, the machine is provided with a supporting frame constructed generally as a rectangular box-like frame 1 having a table surface 2 formed at the top thereof. Preferably, the frame 1 is formed of angle irons arranged along the various corners of the box-like frame and secured together in any suitable manner. Adjustable foot pieces 3 are arranged at the four lower corners of the frame 1 and maintain the frame in spaced relation with respect to the floor or supporting surface.

A lower sealing jaw indicated generally at 4 in Figures 1 and 2 is supported on the table surface 2, and a movable sealing jaw, represented generally at 5, is arranged above the stationary jaw 4 and is mounted for vertical reciprocation on a movable frame having two vertical sides formed of two tubular members 6 and 7 having threaded engagement at their lower ends with vertical rods 8 and 9. The tubular members 6 and 7 pass through suitable bearings 10 and 11 supported immediately beneath the table surface 2, and the lower ends of rods 8 and 9 pass through suitable bearings 12 and 13 mounted in the lower part of the machine frame directly below bearings 10 and 11, respectively. Bearings 12 and 13 are supported upon stirrups 12a and 13a which are suspended from a horizontal channel iron 14, the two ends of which are supported at the middle of horizontal cross frame members 15 and 16. A horizontal cross bar 17 in the form of an inverted channel iron extends between the vertical rods 8 and 9 between upper bearings 10, 11 and lower bearings 12, 13. The ends of this bar are secured to the rods 8 and 9 by suitable means such as the clamping nuts shown in the drawing.

Mounted immediately below the center of the cross bar 17 is an operating cylinder 18, such as a pneumatic cylinder, having a piston 18a connected to the center of the bar 17 by a connecting rod 19. The upper sealing jaw 5 is mounted across the upper ends of tubular members 6 and 7. By suitably energizing the cylinder 18 in a manner to be described, the sliding frame carrying the movable sealing jaw 5 may be reciprocated vertically between the open position shown in Figure 1 to a lower or sealing position where the movable jaw 5 engages the lower stationary jaw 4.

The sealing jaws of the machine described herein are of the heated type, and the preferred arrangement is illustrated in Figure 4. The upper jaw 5 is formed of a metallic bar mounted in a larger metallic bar 5a supported by an inverted channel bar 5b mounted at opposite ends on tubular members 6 and 7. The bar 5a is heated by suitable electric heater units arranged within the bore 5c and is maintained at a predetermined temperature by a thermostatic element mounted within the bore 5d. A strip or bar 5f of heat insulating material, such as asbestos, is interposed between the heated bar 5a and the channel bar 5b to prevent loss of heat. A suitable guard member 5e in the form of an inverted channel member is arranged over the upper sealing jaw to protect the hands and arms of the operator from injury by the heated jaw as will be explained later. Electric current for heating jaw 5 is supplied by a cable C which passes upwardly through tubular member 6 to a connector Ca carried by channel bar 5b. The lower sealing jaw is formed of a metallic bar 4a heated by suitable electric units positioned in bore 4b and controlled by a thermostatic element positioned in bore 4c. A heat insulating strip 4a' is interposed between the bar 4a and the table 2 to prevent loss of heat through the table. The actual sealing surface of the lower jaw is provided by a strip of heat-resistant, yieldable or springy material 4d, such as silicone rubber reinforced with fiber glass, arranged on the upper edge of the bar 4a and held in position by a pair of clamping angle pieces 4e secured on opposite sides of the bar 4a. The yieldable sealing strip provides a cushioning effect to seal across any creases or folds which are found in the neck of the bag. The springiness of the strip makes it possible to seal the thin sections between folds without using excessive pressure which would cut through the folded portions. The silicone rubber strip is also useful in the sealing of thermoplastics which become sticky at sealing temperatures, since it prevents sticking of the material to the jaw.

As shown in Figure 4, the lower front edge of sealing bar 5 is rounded to prevent a squeezing out and thinning down of the bag material under heat-sealing pressure. The sharp right-angle corner on the rear side of the bar allows the bag surplus to be torn off cleanly when the material is hot and plastic from the sealing operation. A pair of guard plates 4f are arranged on opposite sides of the lower sealing jaw to prevent burning of the hands of the operator by the jaw.

A bag-supporting trough or guiding member 20 is mounted on the forward part of the table surface 2 in front of the stationary sealing jaw 4. As shown in Figure 1, the member 20 has a rounded trough-like upper surface for receiving the filled bag and for holding it centered with respect to the sealing jaw 4 and in a position such that the neck of the bag may extend across the jaw 4 to the rear side of the jaw and connect with an evacuating nozzle. The arrangement of a bag is illustrated in dotted lines at B in Figure 2. The trough or guiding member 20 may assume different forms, depending upon the shape of the article being packaged in the bags, and is detachably mounted on the machine to permit ready substitution of troughs of different sizes and shapes. A guard plate 20a with a rounded upper edge may be mounted between the trough 20 and the lower sealing jaw 4, although this is not essential.

An evacuating nozzle 21 is mounted on the rear part of the table surface 2 immediately behind the stationary sealing jaw 4 and in line with the guiding trough 20. Preferably, the evacuating nozzle is of hollow construction and is relatively flat, as shown in Figures 1 and 2, and is tapered from back to front in the horizontal and vertical planes. The mouth of the bag fits on the front portion of the nozzle, and it is desirable to have the nozzle of a proper size, such that the nozzle substantially fills the open end of the bag. The front, rounded edge of the nozzle 21 is provided with a number of transverse slots 21a which provide a series of transverse openings arranged along the front edge of the nozzle through which air from the bag is evacuated. For the purpose of preventing folds of the bag material from entering the slots 21a and cutting off the vacuum from the bag, I prefer to line the slotted edge of the nozzle with a thin sheet of metal which is perforated with very fine holes or with a sheet of wire gauge of small mesh. This arrangement is effective in preventing the collapsed folds of the bag material from entering the slots to any considerable extent, and the presence of the bridge pieces between the slots prevent the material from cutting-off all of the perforations in the liner sheet.

A number of nozzles of different sizes will be provided to accommodate different sizes of bags, and for the purpose of quickly substituting one nozzle for another, each nozzle is provided with a tubular neck 21b which is mounted in a tubular socket 22 carried by a plate 22a slidably mounted on the table surface 2. The plate 22a is arranged between a pair of parallel hold-down and guiding strips 22b and 22c arranged at right angles to the sealing jaw 4, whereby the vacuum nozzle is mounted for sliding movement towards and away from the jaw and at right angles thereto. The neck 21b of the nozzle may be clamped in the sleeve 22 by means of a wing-screw 22e on the sleeve 22.

The mounting sleeve 22 for the vacuum nozzle is connected by a flexible hose or pipe 23 to a control valve 23a in a vacuum line 23b connected to a suitable vacuum pump or vacuum system not shown.

Passing through the center of the nozzle 21 is rod 24 which has a bore in the front portion 24' thereof and opening through the side at a point within the interior of the nozzle 21, the rear end of the rod 24 being closed or made of solid material. The tubular end portion 24' of rod 24 forms an extension of the evacuating nozzle 21. A suitable packing is provided around the rod 24 where it passes through the rear wall of the nozzle, and the rod 24 is mounted for movement axially thereof from a position shown in Figure 2 extending across the sealing jaw 4 to a position where the rod is withdrawn from between the jaws. As shown in Figure 2, the hollow rod 24 constitutes an extension of the evacuating nozzle 21 extending through the neck of the bag B beyond the sealing jaws and beyond guard 20a to a position where there is no likelihood of the wall of the bag closing the end of the tube portion 24' of the rod 24. The rod occupies this position during the evacuation of the bag, and as soon as the bag has been evacuated the rod is withdrawn from the neck of the bag by an arrangement now to be described.

At the back of the machine a lever 25 is pivotally mounted at its lower end on a fixed bracket 26, the pivotal axis being indicated at 25a. The upper end of lever 25 is bifurcated, and the two arms of the bifurcation extend on opposite sides of the rod 24 between a pair of fixed abutments 24a which cause the rod to partake of the movement of the upper end of lever 25. A second bracket 26 formed of U-shaped structure is mounted on the rear side of the machine near the upper part thereof for guiding the upper end of the lever 25 in a path parallel with the axis of the rod 24. Suitable means is provided for moving the lever 25 from the full line position shown in Figure 2 to the dotted line position 25' when the upper sealing jaw 5 moves down into the sealing position. One suitable arrangement involves a link 27 pivotally connected at one end to the lever 25 as shown at 27a, and the other end being pivotally connected at 27b to an arm 28 carried by the cross-bar 17 forming part of the vertically movable frame carrying the upper sealing jaw 5. It will be clear from Figure 2 that when the cross-bar 17 moves downwardly to the dotted line position 17', the link 27 will be in the position 17' and will force the lever 25 to the right and into the dotted line position shown at 25', thus withdrawing the tubular portion 24' to a position allowing the sealing bars to close and seal the neck of the bag without interference from the rod. When the sealing operation has been completed and the cross-bar 17 raised to its upper position, the tubular portion 24' will be returned to the position shown in Figure 2.

During the evacuation of the bag, the neck of the bag is subjected to some tension due to the evacuating operation, and it is desirable that this tension be relieved somewhat during the sealing operation. For this purpose, provision is made for shifting the vacuum nozzle 21 towards the sealing jaw 4 during the sealing of the bag. One way of accomplishing this involves a lever 29 pivoted at 29a to the bracket 26. The upper end of the lever 29 is bifurcated and engages a pin 22f carried by the arm 22d secured to the plate 22a. The lower end of the lever 29 also is bifurcated and engages a pin 25b carried by lever 25. This arrangement of lever 29 causes the plate 22a to move in accordance with the movement of the lever 25 but in an opposite sense. In other words, when the lever 25 moves to the rear to withdraw the tubular portion 24' of rod 24 from over the jaw 4, the plate 22 and nozzle 21 are moved forward a short distance to relieve the tension on the neck of the bag.

The vacuum connection to the evacuating nozzle 21 is normally cut off by means of a biasing spring 30 which pulls the valve operating arm 31 in a direction to close the valve 23a. When it is desired to evacuate, the valve 23a is operated by means of a treadle 32 which has an arm 32a connected to the valve operating arm 31. The treadle 32 and the arm 32a are mounted on an angle iron 32b which is pivotally supported on a horizontal axis 32c by suitable brackets 32d.

A number of safety devices are provided in the machine, including the shield plates 4f associated with the lower sealing jaw and the shield 5e arranged over the upper sealing jaw. This channel member is loosely mounted on the channel bar 5b and is free to be raised above the bar 5b. When the channel guard 5e is resting upon the bar 5b, the front face of the guard extends below the lower edge of the sealing jaw 5 as shown in full lines in Figure 1 and in dotted lines in Figure 4. For the purpose of raising the shield 5e during sealing, a pair of downwardly extending rods 33 and 34 are secured to the ends of shield 5e and pass loosely through vertical holes formed in the ends of channel bar 5b. Rubber buffer tips 33a and 34a are arranged on the ends of these rods to prevent shock when the rods engage the table surface 2 of the machine. The rods 33 and 34 are of such length that they engage the surface 2 before the jaw 5 comes into contact with the lower jaw, and these rods maintain the shield 5a in an elevated position as shown in full lines in Figure 4. Thus, the shield 5e does not interfere with the sealing operation when the jaws are closed, but moves down into a lower position shown in dotted lines to protect the arms of the operator against burning from the jaw 5 when the jaw is moved to raised position.

The upper sealing jaw is normally held in raised position by means of a safety latch 35 pivotally mounted on bracket 36 and engaging the lower edge of the cross-bar 17, as shown in Figure 2. The latch 35 is moved to unlatching position by means of an electromagnet 37 mounted on bracket 36. This magnet is energized in parallel circuit relation with another electromagnet 38 controlling the valve 39 of the operating cylinder 18. The magnet 38 is mounted on a suitable bracket 38a and controls the valve 39 by means of a bell-crank 38b pivotally mounted on the bracket 38a. When the magnet 38 is energized, the valve 39 connects inlet pipe 39a to the upper end of cylinder 18 through pipe 39b, and connects the lower end of cylinder 18 through pipe 39c to exhaust pipe 39d which includes a valve 40 which is spring-biased to open position. The stem of the valve 40 is provided with roller 40a which is engaged by an operating finger 41 carried by the cross-bar 17 of the frame supporting the upper sealing jaw of the machine. The arm 41 serves to partly close the valve 40 and thereby retard the downward movement of the upper sealing jaw as it approaches the lower sealing jaw.

When the magnet 38 is deenergized, the valve 39 connects inlet pipe 39a to the lower end of the cylinder 18 through pipe 39c, and connects the upper end of the cylinder through pipe 39b to an open exhaust pipe 39e to effect raising of the frame carrying the upper sealing jaw.

Electromagnets 37 and 38 are connected in parallel in a common control circuit which includes a push-button 42 mounted on the right of the machine for operation by the right hand and a second push-button 43 mounted on the left of the machine for operation by the left hand. These two push-buttons are connected in series from one side of a supply circuit 44 through conductor 44a to a common terminal 44b of the two magnets, and the other side of the supply circuit 44 is connected to a second common terminal of the magnets shown at 44c. With this arrangement, it is necessary for the operator to press both push-buttons 42 and 43 in order to energize magnets 37 and 38 to close the sealing jaws. Thus, with both hands on the push-buttons, there is no chance that the operator's hands will be injured by the closing of the jaws.

After the seal has been formed, and while the sealing jaws are still closed, it is desirable that the right hand of the operator shall be free to tear off the portion of the neck of the bag which extends from the sealing jaws over the evacuating nozzle, and in order to permit push-button 42 to be released for this purpose, a normally open switch 45 is connected in parallel with the push-button 42 and is suitably supported from the cross-bar 14 on frame 1. The switch 45 is provided with an operating arm 45a arranged in the path of travel of a finger 46 carried by cross-bar 17 of the vertically movable frame. The arrangement is such that the finger 46 moves the switch 45 to closed position when the sealing jaws are in sealing position, thereby shunting push-button 42 and permitting its release.

The operation of the machine is believed to be clear from the foregoing description but will be summarized as follows: After the bag has been filled with the material to be packaged, it is placed on the trough 20 and the mouth of the bag is fitted over the evacuating nozzle 21 as shown at B in Figure 2. The bag is evacuated by depressing the treadle 32 to open the valve 23a in the vacuum line. After a short time, and while still maintaining treadle 32 depressed, the operator depresses push-buttons 42 and 43 to move the upper sealing jaw 5 into sealing position in contact with the neck of the bag. Simultaneously with the lowering of the upper sealing jaw, the tubular extension 24' of the evacuating nozzle is withdrawn from between the sealing jaws to permit a complete seal entirely across the neck of the bag, and the nozzle 21 is moved towards the sealing jaws to relieve tension on the neck of the bag. The operator holds button 43 down for a sufficient time to complete the seal, and before releasing the button 43, the operator reaches over the upper sealing jaw with his right hand and tears off the outer portion of the neck of the bag extending between the sealing jaws and the evacuating nozzle. The severed neck part of the bag is removed from the evacuating nozzle in the process of tearing it off, and is then discarded. After this the button 43 is released to raise the upper sealing jaw, and the sealed bag may be removed from the machine.

From the foregoing it will be noted that the evacuating nozzle 21 serves as a plug member for closing and supporting the mouth of the bag during evacuation. It is not essential that this member act as an evacuating nozzle, since the bag can be evacuated through the extension tube 24'.

What is claimed is:

1. A machine for evacuating and sealing flexible bags which have been filled with material to be packaged comprising, in combination, a pair of opposed sealing jaws normally maintained in open position, a support for said bag and contents arranged on one side of said jaws, an evacuating nozzle arranged on the opposite side of said jaws in a position to support and substantially fill the mouth of the bag, means for closing said jaws on the neck of said bag, and means operated in timed relation with the closing of said jaws for shifting said nozzle towards said jaws to relieve the tension on the neck of said bag during sealing thereof.

2. A machine for evacuating and sealing flexible bags which have been filled with material to be packaged comprising, in combination, a pair of opposed sealing jaws normally maintained in open position, a support for said bag and contents arranged on one side of said jaws, a plug member arranged on the opposite side of said jaws in a position to close and support the mouth of the bag, an evacuating tube extending from said plug through the neck of said bag between said sealing jaws, means for closing said jaws on the neck of said bag, and means operated in timed relation with the closing of said jaws for shifting said plug towards said parts to relieve the tension on the neck of said bag during sealing operation and simultaneously withdrawing said tube from between said jaws.

FRANCIS B. CASEY.
ROBERT REED WOODCOCK.
MANSON E. WOOD.

References Cited in the file of this patent

UNITED STATES PATENTS

| Number | Name | Date |
|---|---|---|
| 1,970,193 | Rievel | Aug. 14, 1934 |
| 1,993,442 | Greven | Mar. 5, 1935 |
| 2,103,945 | Henley | Dec. 28, 1937 |
| 2,145,941 | Maxfield | Feb. 7, 1939 |
| 2,241,943 | Berch | May 13, 1941 |
| 2,277,288 | Berch | Mar. 24, 1942 |
| 2,281,187 | Waters | Apr. 28, 1942 |
| 2,305,010 | Kenney et al. | Dec. 15, 1942 |
| 2,387,812 | Sonneborn et al. | Oct. 30, 1945 |
| 2,410,834 | Messmer | Nov. 12, 1946 |
| 2,559,368 | Pancratz | July 3, 1951 |